US012598110B2

(12) United States Patent
Imani Hossein Abad et al.

(10) Patent No.: US 12,598,110 B2
(45) Date of Patent: Apr. 7, 2026

(54) RELATIONAL NETWORK INFERENCING USING RANDOM TRAVERSAL PATHS OF A GRAPH REPRESENTATION

(71) Applicant: INTUIT INC., Mountain View, CA (US)

(72) Inventors: Navid Imani Hossein Abad, Bellevue, WA (US); Nazanin Zaker Habibabadi, Sunnyvale, CA (US); Xue Han, Sunnyvale, CA (US)

(73) Assignee: INTUIT INC., Mountain View, CA (US)

( * ) Notice: Subject to any disclaimer, the term of this patent is extended or adjusted under 35 U.S.C. 154(b) by 141 days.

(21) Appl. No.: 18/515,605

(22) Filed: Nov. 21, 2023

(65) Prior Publication Data

US 2025/0168075 A1    May 22, 2025

(51) Int. Cl.
*G06F 15/173* (2006.01)
*H04L 41/12* (2022.01)
(52) U.S. Cl.
CPC ................................... *H04L 41/12* (2013.01)

(58) Field of Classification Search
CPC ...................................................... H04L 41/12
See application file for complete search history.

(56) References Cited

U.S. PATENT DOCUMENTS

| | | | | |
|---|---|---|---|---|
| 10,990,879 B2 * | 4/2021 | Hunter | .................. | G06N 3/006 |
| 2018/0302430 A1 * | 10/2018 | Israel | ..................... | G06Q 50/01 |
| 2025/0077896 A1 * | 3/2025 | Schauder | ................. | G06N 5/01 |

* cited by examiner

*Primary Examiner* — Yves Dalencourt
(74) *Attorney, Agent, or Firm* — Patterson + Sheridan, LLP

(57) ABSTRACT

Certain aspects of the present disclosure provide techniques for performing inferencing for entities in a relational network by determining graph features of a graph representation of the relational network. Random paths are generated using each node of the graph representation as a starting node and using relative outgoing edge weights to determine next nodes along the traversal path. Probability values that nodes will be reached as secondary nodes along a traversal path are aggregated to generate a score value or graph feature for each node of the graph representation. The graph features may be used as training data to train a machine learning model to infer risk values or graph features based on additional transaction data input.

20 Claims, 8 Drawing Sheets

410

Receive Transaction Data

420

Add Vertices to Graph Representation

430

Add Directed Edges to Graph Representation

450

Provide Graph Feature(s)

440

Define Graph Features for Parameter(s)

400

Figure 6:
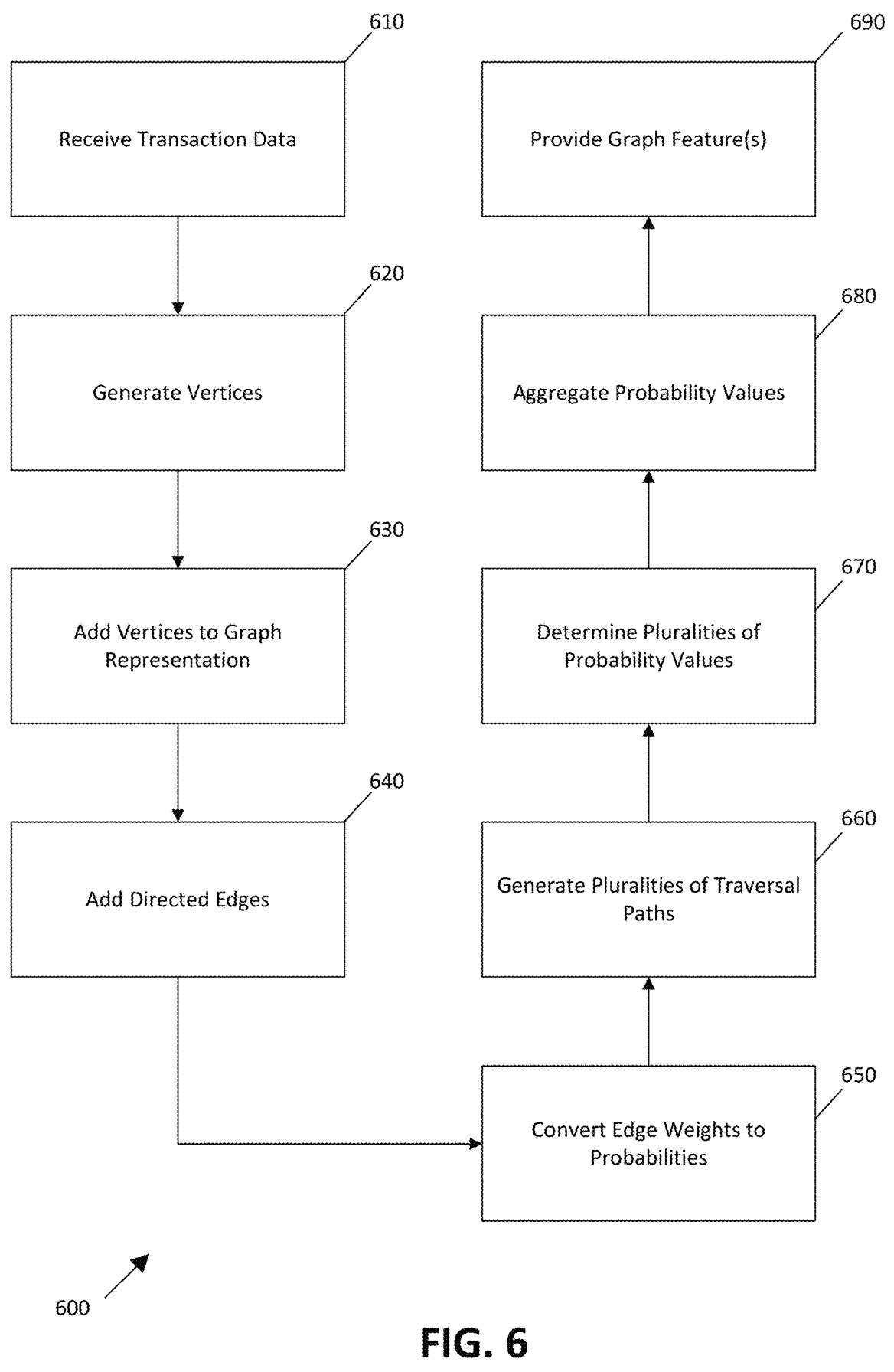

610

Receive Transaction Data

620

Generate Vertices

630

Add Vertices to Graph Representation

640

Add Directed Edges

650

Convert Edge Weights to Probabilities

660

Generate Pluralities of Traversal Paths

670

Determine Pluralities of Probability Values

680

Aggregate Probability Values

690

Provide Graph Feature(s)

Receive Data

720

Add Vertices and Edges to Graph Representation

750

Aggregate Probability Values

740

Determine Probability Values

730

Determine Random Traversal Paths

700

RELATIONAL NETWORK INFERENCING USING RANDOM TRAVERSAL PATHS OF A GRAPH REPRESENTATION

INTRODUCTION

Aspects of the present disclosure relate to inferencing in relational networks using random traversal paths of a graph representation which may be used to predict parameters, scores, or values for entities and/or relationships between entities in a complex network.

BACKGROUND

In many types of situations, a group of entities may be related in complex networks such that an event occurring for one entity can affect outcomes for different entities not directly related to the one entity. Often, it is difficult to determine the effect of a particular entity or relationship on another because the interrelationships between entities in a system or network are too complex to predict exactly the relative effect attributable to any particular entity or relationship. Thus, it may be difficult to hypothesize about what effect the addition, change, or removal of an entity or relationship will have on the system. In cases, the behavior of a complex system of interrelated entities may be complicated enough that is difficult if not impossible to predict results accurately for the system.

Graph representation techniques exist for representing entities as nodes or vertices in a graph representation and relationships between entities as edges between nodes. However, edge and node structures of traditional graph representations are limited in considering various attributes, types, values, and/or other possible metrics associated with edges and/or nodes. Further, predicting outcomes for events using traditional graph representations is limited in depth by the complexity of the interrelationships between entities. As graph representations get larger and more complex, with a greater number of nodes and edges, the computational resources necessary to generate meaningful information from a graph representation can become prohibitive. Size and complexity further complicate the process of accounting for parameters of the relationships or values for the entities.

Accordingly, improved techniques are needed to generate information or results for complex networks of related entities. Techniques are further needed that enable attributes of the entities and/or the relationships between entities to be used to predict better outcomes by generating improved and/or more meaningful results that account for attributes, parameters, and/or metrics associated with the entities and/or relationships.

BRIEF SUMMARY

Certain embodiments provide a computer-implemented method for relational network inferencing using random traversal paths of a graph representation. In some embodiments, a method for determining graph features for a graph representation of a system of related entities for which transaction data is received is disclosed.

In various embodiments, A method of resource-efficient relational network inferencing is disclosed, comprising: defining, for a graph representation, a plurality of traversal paths including: a starting vertex having an initial probability value; and a random hop selected based on a weight of an edge and a total weight of selectable edges for the hop; and determining a probability that an entity represented by a particular vertex will be impacted by an event associated with the starting vertex based on the initial probability value and a proportion of the plurality of traversal paths that includes the particular vertex.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 6 illustrates an example method of relational network inferencing using random traversal paths of a graph representation, according to various embodiments.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
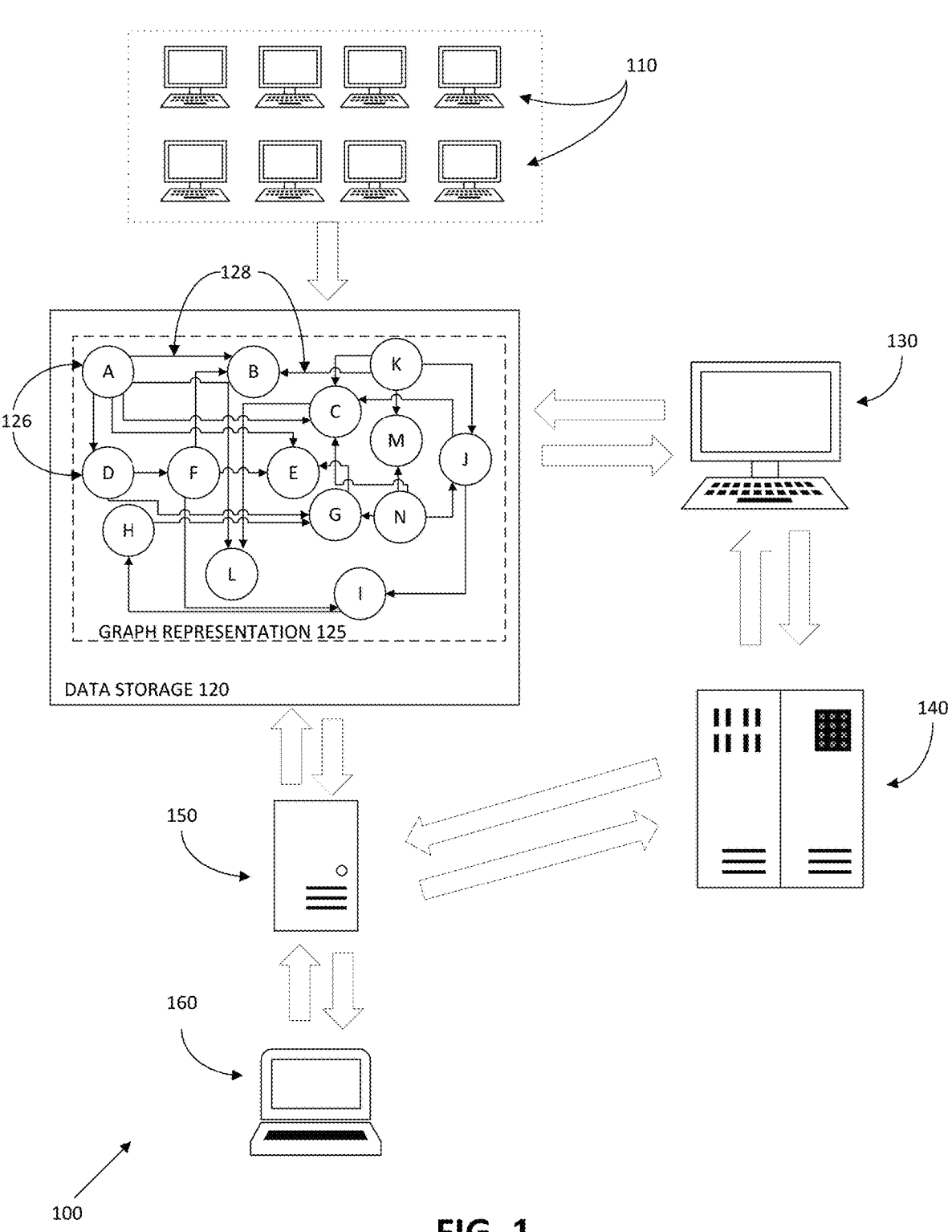
FIG. 1 illustrates an example computing environment for relational network inferencing, according to various embodiments.

Unlike traditional graph representation techniques, methods disclosed herein account for various parameters associated with entities and/or with relationships between entities. Methods disclosed herein may account for nodes and edges that may be remote to or indirectly connected to a particular node or edge of a graph representation. With traditional graph representation techniques, edges represent relationships between nodes. Traditional techniques, however, fail to account fully for parameters associated with the edges, nodes, and interrelationships between nodes not directly connected by edges. Methods disclosed herein enable graph features to be determined for graph representations of complex networks of entities by using a set of random traversal paths which include "hops" from node to node along outgoing directed edges of the graph representation.

In embodiments disclosed herein, at the hops, outgoing edges leaving the nodes are assigned edge weights that determine the likelihood of that edge being the edge selected for a hop to a subsequent node. The edge weights can be determined based on parameters for each node, for a selection of nodes, a selection of nodes and edges, for any other feature of the graph representation, etc. In this way, various values, scores, or probabilities can be generated despite the complexity or dynamic nature of a network.

In particular, embodiments disclosed herein may apply to a network regardless of complexity with regard to number of entities, number of relationships, number of transactions between entities, parameter types for transactions, attributes of entities, etc. A graph representation may thus contain an unbounded number vertices and edges, such that there may be any number of nodes (or vertices) and any number of edges between the nodes.

The edges may be directed edges, such that each edge for a node is either outgoing or incoming. Traversal paths can be generated using a random walk technique which travels from node to node along outgoing edges. In the case of multiple outgoing edges leaving a node, one of the outgoing edges leading to a next node can be chosen at random. The relative chance for each edge being selected can be proportionate to weights for the edges that are determined by any number of parameters defined or selected for the edge. In this way, a graph representation of a complex network can probabilistically represent complex systems and can be used to determine information and/or make inferences about entities of the system. For example, a value for an entity may generated by making an inference based on scores for nodes determined according to random traversal paths. By weighting edges according to various attributes, parameters and/or types associated with the relationships between entities, and selecting outgoing edges along the random traversal paths using the weights of the outgoing edges, a determination of a relative influence or chance of a path going through a node can be determined, which can be useful in a variety of applications. Traversal path information, such as relative influence of the nodes of the underlying graph representation, can also be useful training data for machine learning purposes, such as for training an inference model.

Various embodiments of the present invention may be useful in applications such as supply chain, risk propagation, social media influence, etc. Due to the dynamic interrelations of entities in such complex systems, an event for one entity can affect other entities or relationships between entities. For example, for a complex network of borrowers and lenders, a default or bankruptcy for one of the entities in the network can have an effect on the likelihood of default for other entities in the network which may be heavily dependent on the interrelationships. Continuing the example of a network of borrowers and lenders, a risk of default for a first entity may change based on relationships between entities or due to a default of a remote entity. Even if entities are not directly connected by an edge, remotely interrelated nodes may still impact each other.

Aspects of the present disclosure provide techniques for identifying features, such as a probability or risk score for a node or collection of nodes, of a graph representation, which may be used to train a machine learning model for inferring a probability or risk score based on inputting additional transaction data and graph features of a combined graph representation including the additional transaction data.

The graph features may be generated by defining edge weights based on the parameters for relationships between entities and generating a plurality of random traversal paths to determine a value for each node. The graph features may then be used to train the inference model so that the model may make predictions based on queries and/or additional transaction data.

To perform the calculations needed to determine the probability values in some embodiments, an adjacency matrix A_d is defined for every parameter type d affecting edge weight. In this example, if n is the number of entities represented by a graph representation, then A d is of dimension n*n. Further, rows and columns of the adjacency matrix A_d may be labeled a list of entities, which may be ordered. For example, if there is an edge between companies i and j that has edge weight w_d then the value w_d is added in row i, column j, of the adjacency matrix A_d.

A vector V of size n can be defined which captures entity default probabilities for every index of the vector V. In this example, each index of the vector V represents an entity, such as a company in the ecosystem represented by the graph representation.

To compute node features for weight type d for k hops away from a vertex, the vector V may be multiplied by the adjacency matrix A_d, a number k times equal to the number of hops. In this way, the computational cost of calculating node features for weight type d is reduced from a non-polynomial time complexity class to a bounded computational cost on the order of $O((n^(2.37*(k-1))+1))$ in the worst case scenario. In practice, the constant k for the number of hops for random walks is bounded (for example k=4), and the vector V may be sparse, thus the actual computation cost can be significantly below $O((n^(2.37*(k-1))+1))$. In some cases, a minimum value for the number of hops k and a maximum value for the number of hops k may be used. For example, random walks may be generated paths having two random hops, three random hops, and four random hops, where k=2 is the minimum and k=4 is the maximum.

In various embodiments described further below, a machine learning model is trained using such node features to provide a score or value based on input to the model, such as computing a risk score for an entity based on a prompt and/or additional transaction data. By decreasing the computation cost of graph traversal through techniques described herein (e.g., using random traversal paths), embodiments of the present disclosure allow such risk scores or other determinations to be generated with less computing resource utilization than prior techniques (e.g., those that do not involve random traversal paths as described herein), and thereby improve the functioning of the computing devices involved as well as improve the technical field of resource-efficient relational network inferencing.

Example Computing Environment for Determining Probability in a Relational Network FIG. 1 illustrates an example computing environment 100 for determining a probability of an event for an entity in a relational network, according to various embodiments.

In FIG. 1, transaction data present on one or more computing devices 110 is transferred to and stored at a data store 120, and used to generate a graph representation 125 of the transaction data. In various embodiments, the transaction data includes electronic records of a plurality of transactions between pairs of entities and identifications of the entities that are parties to each transaction. For example, the transaction data may include an identification of a buyer and a seller associated with a transaction or an identification of a borrower and lender associated with a transaction in the transaction data. The transaction data may also include various parameters associated with the transactions. For example, a payment amount, liquidity rating, a net worth, a payment type, payment history, credit utilization, credit age, new credit rating, credit mix rating, income, debt, number of invoices, amount of invoices, amount of all transactions, number of defaults, risk rating, etc., can all be included in the transaction data.

In FIG. 1, the graph representation 125 includes a plurality of nodes 126 and a plurality of edges 128. The nodes 126 of the graph representation 125 represent entities included in the transaction data. The nodes 126 of the graph representation 125 may have various parameters associated therewith. For example, a payment history, credit utilization, credit age, new credit rating, credit mix rating, income, debt, etc., may be parameters for the nodes 126.

The edges 128 of the graph representation 125 represent relationships between entities. In various embodiments, the edges 128 may be directed edges 128, such that the edge is directed from a borrower to a lender, or vice versa. The edges 128 may also be weighted edges. In various embodiments, the weights of edges 128 can be determined according to various parameters such as payment amount, payment type, number of invoices, sum amount of all transactions, etc.

Edges may have an edge weight determined by values for various parameter types or combinations of one or more parameter types. In some cases, a template is used to determine an edge weight based on a weighted combination of parameters. However, it is not necessary that a parameter value is available for each parameter type for a particular edge and edge weight to be assigned.

In FIG. 1, an administrator device 130 is connected to the data storage 120 to access the graph representation 125. The administrator device 130 may be used to generate one or more random traversal paths of the graph representation and may be used to generate one or more scores or values for one or more of the various parameters by aggregating values for nodes 126 and/or edges 128 along a particular traversal path. The one or more random traversal paths and the aggregated scores for the nodes along the one or more random traversal paths may be input as training data into a machine learning training module 140 to generate an inference model 150 for the relational network.

In FIG. 1, an application server 150 is connected to the machine learning training module 140, the data storage 120, and an endpoint 160. In various embodiments, new transaction data may be received by the application server 150 from the endpoint 160. The application server 150 may include a probability estimator or risk evaluator that determines the chances of a particular event for an entity using random traversal paths of the graph representation 125, for example, a risk of default. A user of the endpoint 160 can access the probability estimator of the application server 150 to receive a determination of a probability for a particular event based on the graph representation, or given default parameters for the nodes 126 and edges 128 of the graph representation and based on a query and/or additional transaction data.

As described further below with reference to FIG. 2, new transaction data may be added to the graph representation

125, and a new set of random traversal paths and scores can be generated using the graph representation 125 with the new transaction data added to determine a score, expected value, or probability of an event (such as risk of a default on a loan or a bankruptcy for an entity) based on the new transaction data. To determine such a likelihood, the new set of random traversal paths and scores are generated. The new set of random traversal paths may be used to generate updated edge weights, or to update values for edge weight parameters used to determine edge weights. The updated edge weights or parameter values may be provided at runtime from the endpoint to the inference model.

In a particular embodiment, a risk of default for a borrower is determined by the machine learning inference model based on one or more events input into the model. In various applications, the events input into the model may be represented by assigning a plurality of parameter values to an edge or node. For example, a default of an entity can be represented by changing values associated with parameter types such as number of defaults, net worth, liquidity rating, etc.

In another example, likelihood of a node being impacted, such as a risk value or other score, is determined for each node of the graph representation, and the nodes and values are used as training data for a machine learning model. Additional transaction and/or entity data, either real or hypothetical, can be input into the machine learning model to infer a risk value or other score for particular node of the training data, additional transaction data, and/or additional entity data. A random traversal path technique can then be applied. Thus, the trained model may be used to provide various graph features using new transaction data without requiring retraining of the inference model. An updated risk value or score can be determined for one or more nodes based on additional transaction data used as context when querying the inference model without requiring retraining.

Example Graph Representation of Transaction Data for a Relational Network

Figure 2:
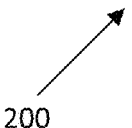
FIG. 2 illustrates an example of a graph representation of transaction data for a relational network, according to various embodiments.

FIG. 2 illustrates an example of a graph representation 200 of transaction data for a relational network, according to various embodiments. In FIG. 2, a new node O 205 has been added to the graph representation 200. In the example, node O 205 represents a borrower from lenders represented by node A 210, node B 215, and node K 220. The relationship between O and A is represented by edge 230, and edge 230 is weighted by a total amount owed to node A 210. The relationship between node O 205 and node B 215 is represented by edge 235, and edge 235 is weighted by a total amount owed to node B 215. The relationship between node O 205 and node K 220 is represented by edge 240, and edge 240 is weighted by a total amount owed to node K 240. In various embodiments, the edge weights may be weighted by various other parameters, such as a number of transactions or a transaction type.

For every parameter type for every vertex of the graph, for every outgoing edge of that vertex, weights are converted to probabilities with edges having higher weights proportionally being assigned higher probabilities. One way to define the traversal probability on an edge is by dividing the weight of the edge by the sum or total of the weights on all outgoing edges of that particular vertex. In other words, for every given vertex A of the graph representation, each outgoing directed edge leaving vertex A is given an edge weight based on a ratio of transactions between the entity representing that vertex A and a secondary vertex B to a total sum of transactions of vertex A. An alternative formula or template may be used for multiple parameters, where the formula provides an edge weight based on the multiple parameters. Other formula may also be used, including formula that may specify a minimum or maximum edge weight.

For every graph feature, for every vertex in the graph, the influence of that vertex on other vertices in the graph is calculated as a probability of a random traversal path starting at that vertex and ending at a particular secondary vertex (using the probability values of edges defined by the parameter or set of multiple parameters). In various embodiments, the probability of a random traversal path starting at the particular vertex and including (or concluding at) the secondary vertex in the graph is calculated. This process is done for each of a particular number of hops for every such secondary vertex in the graph representation. The values of the random walk probabilities including (or in some cases ending) at that secondary vertex are summed or aggregated. Further, a plurality of random traversal paths may be separately generated for each parameter type used to calculate edge weight, and the results for each parameter may be aggregated. In some embodiments, the aggregated values are normalized to a maximum of one (or unity).

In various embodiments, new parameters, nodes, or edges may be determined from additional transaction data and added to the graph representation based on the additional transaction data. In general, any number of nodes, edges, or parameters may be introduced to the graph representation to determine initial graph features, and any number of nodes, edges, or parameters may be provided as context or input to an inference model trained using the initial graph features to determine new graph features or values for entities.

In various examples a risk of default for an amount owed by the entity associated with each node includes a default value determined from a corpus of transaction data. The default values may be changed by propagating one or more events or transactions determined from additional transaction data. For example, an administrator or user may input transaction data for node O 205 to determine an adjusted risk of default for any of the nodes in the graph representation 200, including a risk of default between directly connected nodes such as Node A 210 and Node B 215 based on a risk for Node O 205, including a risk for nodes directly connected to the defaulting node but indirectly connected to each other, (such as Node A 210 and Node K 220), and/or including nodes having other types of relationships.

As an example, it may be desired to determine a risk value for node A 210. By generating random walks for each node of the graph representation 125, default risk values may be assigned for each node of the graph representation, including for node A 210. However, it may further be desired to determine an update risk value for node A 210 based on some additional data, real or hypothetical. In this example, new node O 205 is introduced, along with edges 230, 235, 240. A new set of random traversal paths may be generated using node A 210 as a starting node. The newly generated paths may traverse one or more of the new nodes or edges. For example, some of the random paths may go from node A 210 along edge 230 to node O 205. Some random paths may go from node A 210 to node B 215 then to Node O 205. Still other paths may go from node A 210 to node D to node F to node B 215 then to node O 205. The random traversal paths may have a hop limit corresponding to a maximum number of nodes which may be along a path. Probability values for each node visited as a secondary node are aggregated to obtain new graph feature values for node A.

These feature values may be provided to a machine learning model that has been previously trained using features of the graph representation 125.

In some embodiments, every node within a number of hops from the node for which a risk value is to be determined is used as an initial node for a plurality of random traversal paths. In other words, continuing the example, to determine a risk score for node A 210 using four hops for random traversal paths, every node within four hops from node A 210 may be used as an initial node for a plurality of traversal paths. The nodes along the paths are assigned probability values that are aggregated to determine a risk score or feature value for each of the nodes within the number of hops from node A 210. These features may all be provided to a machine learning model that has been previously trained using features of the graph representation 125 to generate an updated risk score for node A 210.

Figure 3:
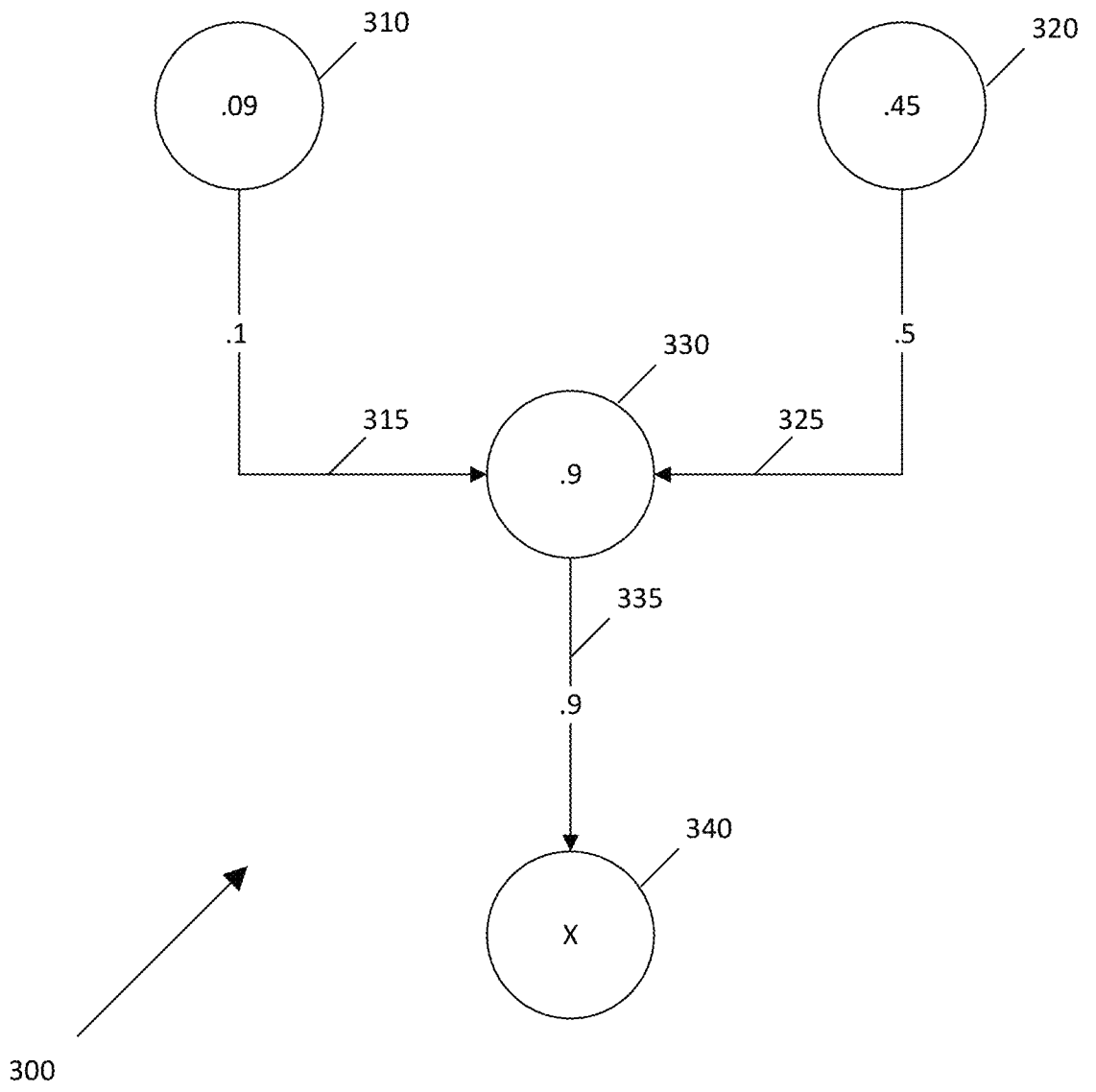
FIG. 3 illustrates an example of a random walk of a graph representation, according to various embodiments.

Example of Determining Probability Values Using Random Walks of a Graph Representation FIG. 3 illustrates an example of determining probability values using random walks of a graph representation 300, according to various embodiments. In FIG. 3, a first vertex 310 and a second vertex 320 are each respectively connected to a third vertex 330. The first vertex 310 has a probability value of 0.09 and is connected to the third vertex 330 by a first edge 315 that is an outgoing edge from the first vertex 310 to the third vertex 330 and which has an edge weight of 0.1. The second vertex 320 has a probability value of 0.45 and is connected to the third vertex 330 by a second edge 325 that is an outgoing edge from the second vertex 320 to the third vertex 330 and which has an edge weight of 0.5. The third vertex 330 has a probability value of 0.9 and is connected to a fourth vertex 340 by a third edge 335 that is an outgoing edge from the third vertex 330 to the fourth vertex 340 and which has an edge weight of 0.9. The fourth vertex 340 has a probability value of $X=1$, representing the probability for an event that has occurred at the fourth vertex 340. The impact of the event occurring for the fourth vertex 340 on the first vertex 310 and the second vertex 320 is determined by using a random walk of the graph representation 300.

In the example of FIG. 3, the probability values at the vertices in a represent a risk of default for the entity corresponding to the node, and the edge weights represent a strength of connection between entities or value for a parameter associated with a transaction between entities. Random walks may be used to determine probability values for vertices along the walks by generating a plurality of traversal paths using edge weights to propagate the probabilities corresponding to expected values for vertices being reached by a hop along a random path.

Continuing the example, the vertices of FIG. 3 may represent various entities, such as a company or person, and the probability value shown for each vertex represents a likelihood for a particular event occurring for the entity corresponding to that vertex. In an embodiment, the vertices represent companies for which a risk of default depends on one or more related companies. In another embodiment, the vertices may represent a supply chain item for which production is halted due to the halting of another supply chain item. It will be appreciated that the vertices may represent a variety of other entities.

Using the example of propagation of risk of default, relationships between companies may be represented by the edges, and the direction of the edges may be directed from a lender to a borrower. The edges can have one or more weights determined according to one or more sets of parameters associated with the relationship between the companies, such as parameters associated with a transaction history between the entities. Parameters may include, for example, a number of transactions, a transaction type, a transaction amount, a transaction duration, a transaction interest rate, or other parameters associated with the transaction, etc.

Continuing the example, the fourth vertex 340 in FIG. 3 may represent a company that has experienced a default. The impact of the default on companies that are many hops away may be relatively small, approaching a minimum of 0. The impact on companies few hops away may be relatively higher, approaching a maximum of 1. Also, the impact of companies that are strongly connected (i.e., by a series of relatively high edge weights, such as a series of edge weights near 1), is relatively higher, whereas the impact of companies that are weakly connected (i.e., by a series of relatively low edge weights, such as a series of edge weights near 0), is relatively lower.

In this example, the impact of the defaulting company on other companies represented in the graph representation 300 can be determined by generating random walks to determine a risk value for each vertex within a number of hops from the defaulting vertex in the graph representation. In the example of FIG. 3, the first vertex 310 represents a first company and the second vertex 320 represents a second company that are both indirectly related to the defaulting company associated with the fourth vertex 340.

In various embodiments, starting at a defaulting vertex, neighbors that are k hops away, or up to k hops away, may be determined by generated paths having a length of k hops from the defaulting vertex. Probability values for vertices reached along the paths are determined and aggregated. In various embodiments, probability values determined using a plurality of different values k for the number of hops are determined and may be aggregated. Additionally, probability values for vertices reached along traversal paths may be determined using a plurality of different sets of one or more parameters used to determine edge weights.

In the example shown, the probability value of a random traversal path starting at the fourth vertex 340 including the third vertex 330 is determined to be 0.9, due to this being the result of multiplying the edge weight 0.9 of the third edge 335 and the probability value, X=1, for the defaulting vertex 340. The probability value of a random traversal path including the first vertex 310 is 0.09, due to this being the result of the probability value 0.9 for the third vertex 330 being multiplied by the edge weight. 1 of the first edge 315. The probability value of a random traversal path including the second vertex 320 is 0.45, due to this being the result of the probability 0.9 for the third vertex 330 being multiplied by the edge weight 0.5 of the second edge 325.

It is noted that only two hops are shown for the paths in this example. However, paths in general can include any number k of hops, and may be determined for a graph representation having many vertices. Further, it may be the case that there are a plurality of defaulting vertices. In such a case, probability values are determined as described above for a single defaulting vertex for each of the plurality of defaulting vertices, resulting in a plurality of values between 0 and 1, which may be aggregated or summed to determine a resulting probability value. Also, various sets of parameters or templates may be defined for edge weights, and different combinations of parameters, in some cases every possible combination of defined parameters, may be separately used to determine a plurality of probability scores for a vertex which are aggregated to determine a probability value.

In the example of FIG. 3, the first vertex 310 and the second vertex 320 are both two hops away from the fourth vertex 340. Although four vertices are shown and two hops are demonstrated, it will be appreciated that this description is exemplary in nature, and the same or similar techniques may be applied for very many vertices and for up to a significantly larger number of hops, for example 10,000 vertices to 1,000,000 vertices, or more or less vertices, and/or for up to 3-8 hops, or up to 100 hops, or up to more or less hops. In various embodiments, a plurality of probability values may be determined for each of a plurality of values for k. In an example, probability values are determined for vertices using ascending integer values for k up to a given number, for example from k=1 to k=5 hops, or from k=1 to k=7 hops, or to more or less hops. In general, a k value may incremented until vertices that are newly reached fall below a threshold probability value, such as where the risk due to any defaulting companies becomes negligible. For example, the probability values at newly reached vertices may be low enough to round to zero cents when multiplied by a total transaction amount for a company. It is anticipated that various other metrics may be used to determine if or when the effect of increasing the hop limit becomes negligible.

In general, the edge weights of a graph representation 300 may have default values which are determined according to parameters of transaction data represented by the graph representation, and probability values for vertices are determined according to paths as described above. In various embodiments, a value or score may also be provided as input for one or more vertices. For example, a probability value may be set to 1 for one or more nodes to indicate the occurrence of an event at the node. In this way, a risk of default for a company due to hypothetical defaults of one or more other companies can be determined by representing the hypothetical defaults by setting the probability values of vertices corresponding to the defaulting companies to 1. However, other hypothetic values can also be represented, for example by using a value other than X=1 for the fourth vertex 340 to represent a probability of a hypothetical event. Generally, probability values for secondary vertices can be determined based on generating random paths using any number of initial vertices, which may be assigned an initial probability value X up to 1. In various embodiments, the initial vertices may be newly introduced to an existing graph representation of transaction data of a plurality of entities, or may be represented by assigning values to existing vertices of such a graph representation.

Example Operations for Providing Graph Features

Figure 4:
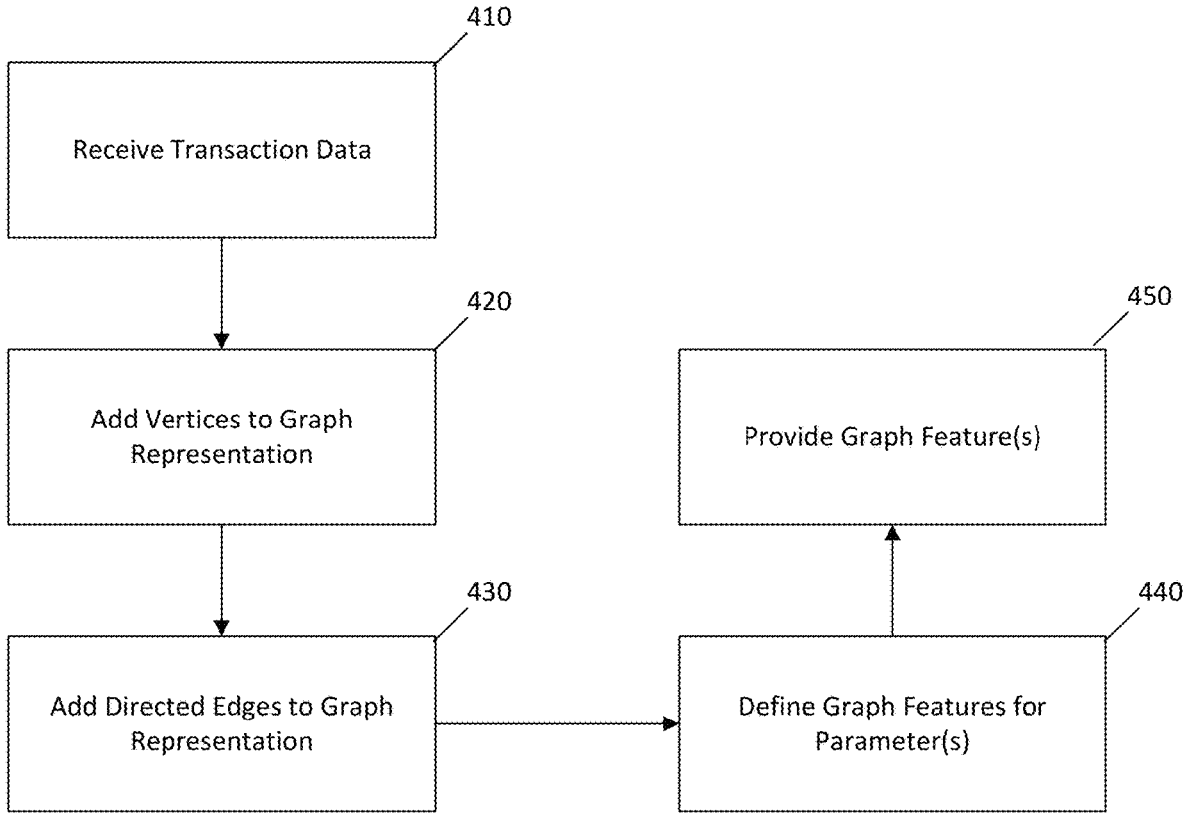
FIG. 4 illustrates example operations for providing a graph feature based on received transaction data, according to various embodiments.
Figure 4:
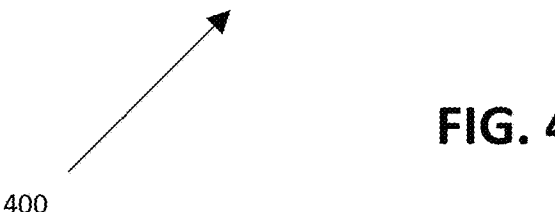

FIG. 4 illustrates example operations 400 for providing a graph feature based on received transaction data, according to various embodiments. In FIG. 4, the operations 400 begin at stage 410 where transaction data is received. For example, the transaction data may come from an existing database, or may be input by a user or administrator.

Next, the operations 400 may proceed to stage 420 where vertices are added to a graph representation. For example, if no vertex exists for an entity that is a party to a transaction contained in the transaction data, a vertex can be added to the graph representation for the vertex. If a vertex does exist for the entity that is a party to the transaction, then one or more attributes can be updated or changed for the vertex.

The operations 400 may then proceed to stage 430 where directed edges are added to the graph representation. For example, relationships such as buyer/seller or borrower/lender are added to the graph representation as directed edges indicating, for example, the borrowing entity and the lending entity.

Next, the operations 400 may proceed to stage 440 where graph features are defined for one or more parameters. In various embodiments, the graph representation can be used to define one or more parameters using random walks of the graph representation. In one example. A graph representation is generated for a large corpus of transaction data, and random traversal paths are used to determine parameters for various entities of the graph representation. In another example, a hypothetical object or event is input into a graph representation having default values for one or more parameters, and traversal paths are generated which result in a new value for the one or more parameters. Continuing this example, a bankruptcy at one node of a graph representation of a corpus of borrower/lender transaction data may influence a parameter, such as receivables, risk of default, or other related parameters, for another entity. In various examples, graph features may be node features, edge features, network features, and/or collections of nodes and/or edges, exhibiting some feature, such as a threshold likelihood of default, a threshold size, a threshold transaction amount, presence of a particular property or type, etc. In examples, randomly generated traversal paths are provided as training data or context to a machine learning model, and one or more graph features are identified by the model.

The operations 400 may then proceed to stage 450 where a graph feature is provided. For example, graph features may be provided to an administrator, application server, client device, or other endpoint. The features may be provided to a machine learning model, or to a result handler which performs one or more actions based on an attribute or type of the graph feature.

Example Operations for Determining Graph Features

Figure 5:
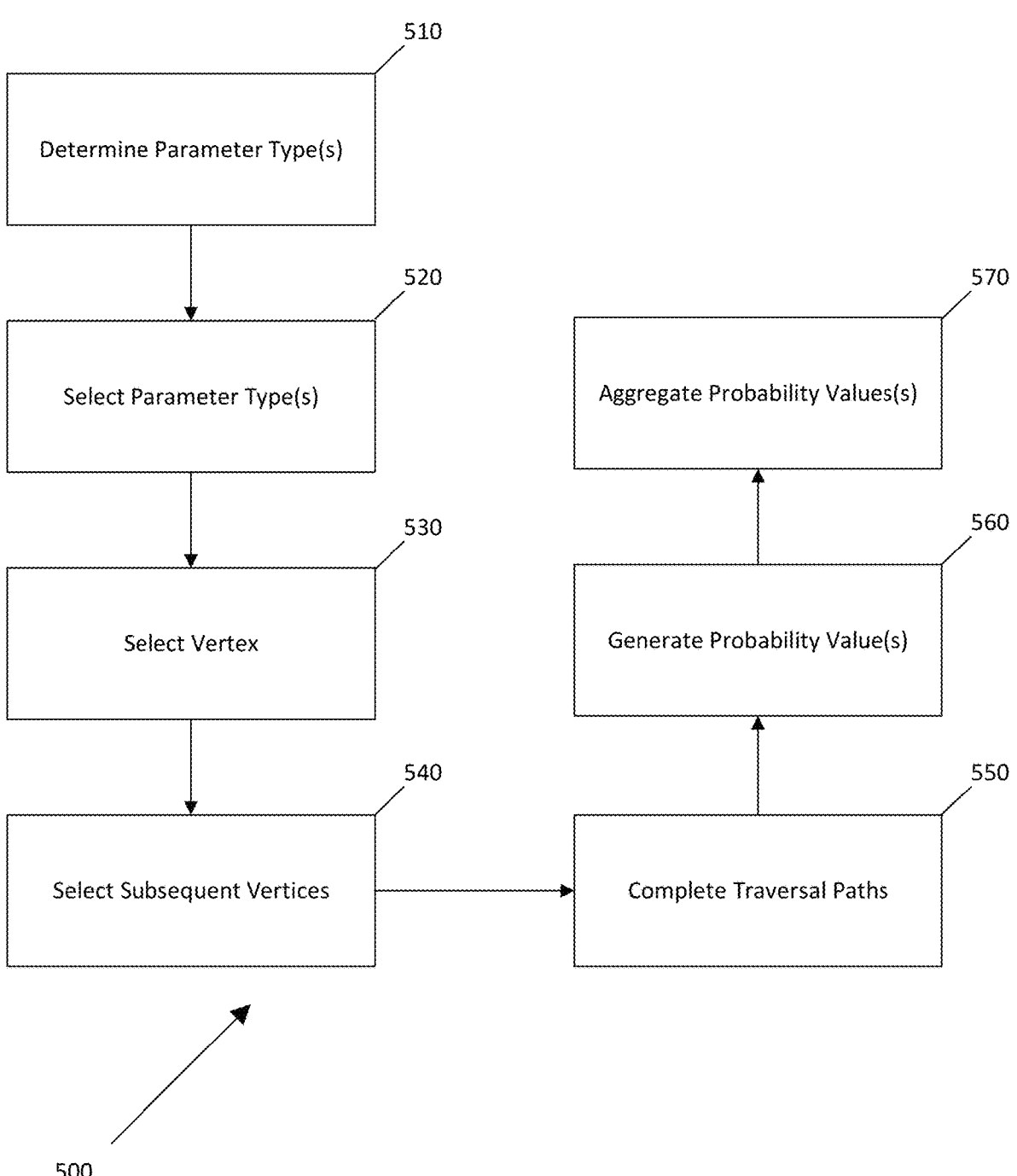
FIG. 5 illustrates example operations for determining a graph feature for a parameter type of a relational network, according to various embodiments.

FIG. 5 illustrates example operations for determining a graph feature for a parameter type of a relational network, according to various embodiments. In FIG. 5, example operations 500 may be used for determining an aggregated probability value based on a parameter type of transactions of the relational network.

In FIG. 5, the operations 500 begin at block 510 where one or more parameter types are determined. For example, transaction data may be parsed to determine parameter types associated with transactions of the transaction data. Various parameter types may include, by way of non-limiting example, a transaction type, a transaction number, a transaction time, a transaction amount, a number of invoices, an amount of an invoice, etc.

Next, the operations 500 may proceed to stage 520 where one or more parameter types are selected. In particular embodiments, a number of transactions and/or a total amount of transactions are selected. In this way, an outgoing edge for a node may be randomly selected based on a ratio of a number of transactions, total amount of transaction, and/or other parameters for respective outgoing edges. Each traversal path may consider a single parameter individually, or may consider a combination of parameters together.

The operations 500 may then proceed to stage 530 where a vertex is selected. For example, an initial vertex is selected as the starting point of a plurality of randomly generated traversal paths. In various embodiments, a sufficiently large number of traversal paths are generated such that stochastic methodology is effective. In will be appreciated that a relatively smaller number of paths may be sufficient for a network with few nodes and/or sparse connections, and that a relatively larger number may be required to achieve the same or similar results with a larger or less sparse network. In general, a sufficient number of traversal paths of graph representations of business to business networks (i.e. with thousands, or millions, or more or less entities) can be achieved in a relatively short time (i.e. minutes, hours, days, or more or less time) for traversal paths having a fixed limit of hops (i.e., four hops, two to six hops, or more or less hops).

Next, the operations 500 may continue at stage 540 where subsequent vertices are selected. In various embodiments, at each hop of the each traversal path, an outgoing edge leaving the present vertex for that hop is randomly selected using the ratio of all edge weights of all selectable outgoing edges for that vertex to determine a relative probability of that edge being chosen for the random selection. In various embodiments, the edge weights include a combination of one or more of a transaction amount, a transaction number, and/or a transaction total. Various other attributes may also be used to calculate edge weights.

The operations 500 then proceed to stage 550 where the traversal paths are completed. Once the paths are completed, a number of times a particular node was reached as a secondary node (as opposed to a starting node) is determined. In some cases, the number of times a path concluded at a particular node may be counted. The operations 500 next proceed to stage 560 where probability values are generated. For example, a count for the number of times a node was reached as a secondary node is divided by a total number of hops to determine a probability for each node.

Next, the operations may continue to stage 570 where the probability values are aggregated. For example, in the case where edge weights are determined based on more than one parameter type, a plurality of traversal paths for each parameter type can be generated, and probability values for each parameter type may be determined for any vertices reached as a second vertex. The probability for each secondary vertex for each parameter type can then be aggregated to determine a score or value for the initial vertex. This process may be repeated for one or more vertices other than the initial vertex. In some embodiments, this process is repeated for every vertex of a graph representation, and the scores or values for each vertex are provided as training data to a machine learning model. Once probability values have been aggregated and/or provided to the model, operations 500 may conclude.

Example Method of Determining Probability Using Random Traversal Paths

FIG. 6 illustrates an example method 600 of determining probability of an event for an entity in a relational network using a random traversal path of a graph representation of the network, according to various embodiments.

As illustrated, the method 600 may begin at block 610, where transaction data is received. For example, data including a plurality of transactions for a plurality of entities may be received. In some embodiments, the transaction data may also include values for one or more parameters associated with transactions between entities in a business to business network.

The method 600 may then proceed to block 620 where vertices are generated. For example, a plurality of vertices or nodes corresponding to the plurality of entities may be generated. Next, the method 600 may proceed to block 630 where the vertices are added to a graph representation. The vertices of the graph representation may represent various entities associated with the transaction data.

Next, the method 600 may proceed to block 640 where directed edges are added. For example, for each respective transaction of the plurality of transactions, a directed edge between vertices of the plurality of vertices corresponding to the respective transaction may be added. Each directed edge can indicate a direction of the respective transaction and/or can include an edge weight. The weights of the edges can be based on a combination of one or more parameter values for one or more parameter types associated with the transactions.

The method 600 may then proceed to block 650 where edge weights are converted to probabilities. For example, for each respective vertex of the plurality of vertices, for each respective outgoing edge of the respective vertex, an edge weight of the respective outgoing edge may be converted to a probability for the respective outgoing edge by dividing the edge weight of the respective outgoing edge by a sum of edge weights for each respective outgoing edge. In various embodiments, the edge weights may be determined according to a parameter, a combination of parameters, or a template defining edge weight.

Next, the method 600 may proceed to block 660 where pluralities of traversal paths are generated. For example, for each respective vertex of one or more vertices of the plurality of vertices, for each of the one or more parameter types, a plurality of random traversal paths can be generated. In embodiments, the traversal paths may be generated by selecting, for each traversal path, beginning at a respective vertex, subsequent vertices based on probabilities for the outgoing edges along the traversal path, for however many edges are needed to complete a specified number of hops. In a particular embodiment, the traversal paths have a hop limit of four hops, however it is anticipated that more or less hops may be utilized.

The method 600 may then proceed to block 670 where pluralities of probability values are determined. For example, a plurality of probability values for a plurality of secondary vertices can be determined. The plurality of probability values are determined by, for each secondary vertex, determining a likelihood that a random traversal path includes or concludes at the secondary vertex. In other words, a probability for each vertex that the vertex will be on a traversal path (or at the end of a traversal path) is determined for each node reached.

Next, the method 600 may then proceed to block 680 where probability values are aggregated. For example, the plurality of probability values for the plurality of secondary vertices for each parameter type can be aggregated to define one or more graph features for the selected initial vertex. In other words, each vertex may be selected as an initial vertex, and for each initial vertex, a plurality of probabilities for secondary vertices along traversal paths from that vertex can be calculated, for each parameter type, and the plurality of pluralities for the secondary vertices may be aggregated to determine a value for that initial vertex. This process may repeated for each vertex, such that probability values are aggregated for each vertex, and any number of graph features may be determined.

The method 600 may then proceed to block 690 where one or more graph features are provided. For example, the values determined for each vertex by aggregated the probability values determined according to the weighted edges and random traversal paths, optionally along with the graph representation, may be provided as training data to a machine learning model.

Such a machine learning model may then be trained to provide graph features or values for entities based on additional transaction data, real or hypothetical, input into the model. Thus, once trained, the system is able to provide graph features and determine values for entities, such as a risk value, by adding nodes and/or edges associated with the additional transaction data to the graph representation, and generating a new plurality of traversal paths from a node to determine a plurality of probabilities for secondary vertices along the traversal paths, which may be aggregated to determine a value or score, such as a risk value, for the node.

Once the one or more graph features are provided and an inference model is trained using the graph feature as training data, the inference model may be used to provide graph features based on input from an administrator or application server, and the method 600 may conclude.

Figure 7:
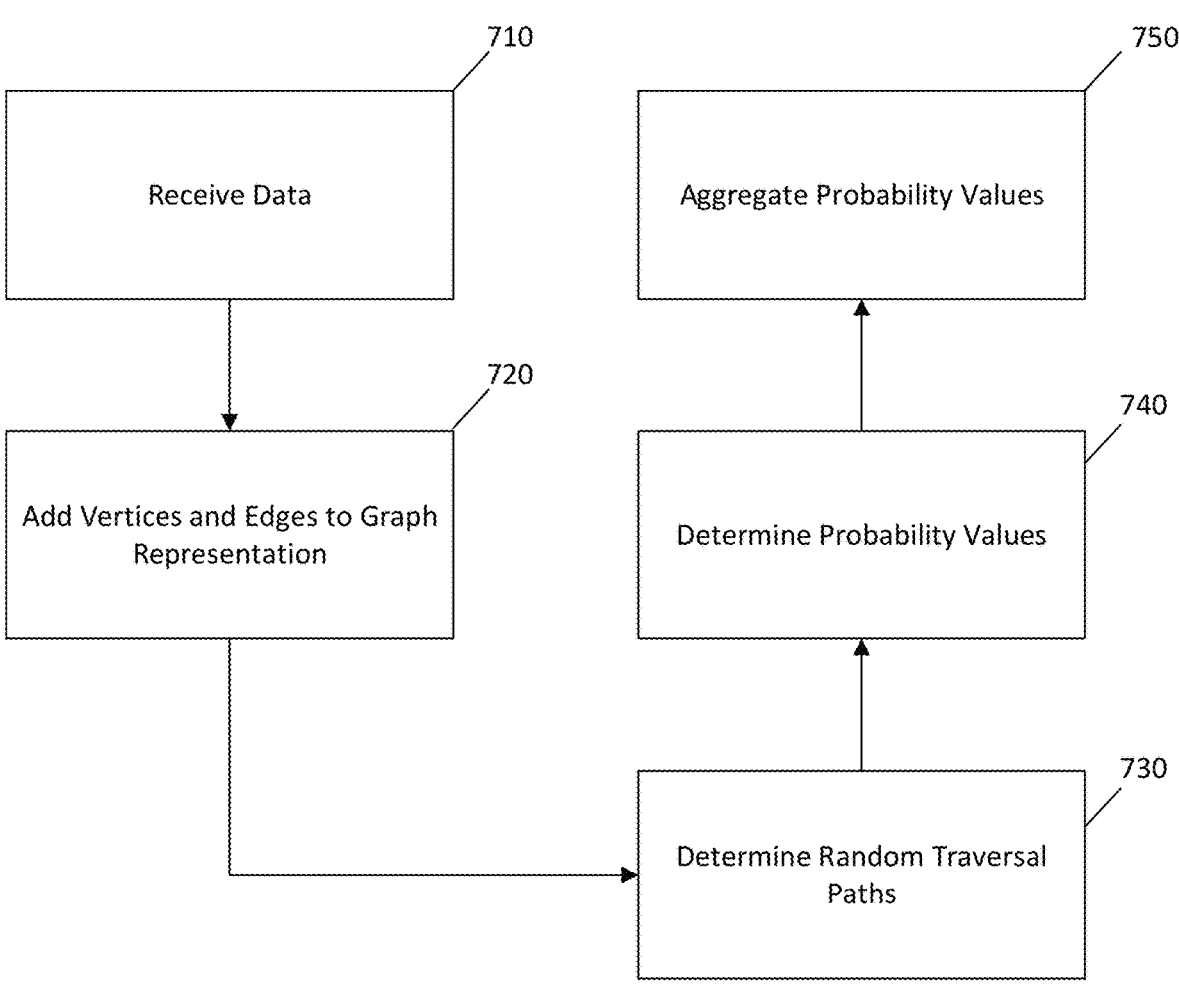
FIG. 7 illustrates an example method of determining features of a graph representation using random traversal paths, according to various embodiments.
Figure 7:
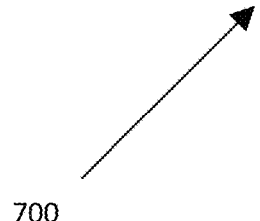

Example Method of Determining Features of a
Graph Representation Using Random Traversal
Paths FIG. 7 illustrates an example method 700 of determining features of a graph representation using random traversal paths, according to various embodiments.

In FIG. 7, the method 700 begins at stage 710 where data is received. In the various embodiments, the data may represent loan transactions, purchases, supply orders, or other transaction data between companies or individuals. The data may include a plurality of transactions for a plurality of entities.

Next, the method 700 may proceed to stage 720 where vertices and edges are added to a graph representation. In various embodiments, the vertices may correspond to entities associated with the data that are involved in a transaction described by the data. Transactions in the data may be represented by edges between entities involved in the transaction. The edges may be directed to indicate a direction of the transaction. The edges may further include edge weights based on values for one or more edge weight parameters, or for different selections of one or more parameters associated with the transaction data. Parameters associated with the transaction data may include a number of transactions between entities connected by a particular edge, a sum monetary value of transactions, a number of transactions of a particular type, etc.

Next, the method 700 may proceed to stage 730 where a plurality of random traversal paths is determined. In various embodiments, secondary vertices up to a number of hops k from one or more initial vertices defined on the graph representation are determined by generating random traversal paths using the one or more initial vertices as starting vertices for the traversal paths. In embodiments, an initial probability value may be defined, provided, or otherwise received for the initial vertices used as starting vertices for the random traversal paths. In various embodiments, the random traversal paths are determined by performing a number of hops along the graph representation up to k hops beginning at an initial vertex and using the initial probability value for that vertex, wherein the random traversal paths are determined by selecting, until up to the certain number of hops has been performed, a next vertex for each hop by selecting one or more subsequent edges from a present vertex to the next vertex according to a ratio of edge weights for the present vertex.

The method 700 may then proceed to stage 740 where probability values are determined. In various embodiments, probability values are determined for a secondary vertex that is reached along at least one traversal path. In embodiments, a probability value is determined for each secondary vertex reached along any of the plurality of traversal paths. For each of a plurality of secondary vertices reached by more than one different traversal path, the probability for each traversal path may be aggregated for that vertex.

For example, for a secondary vertex, probabilities that the secondary vertex is included in a plurality of traversal paths can include determining more than one probability value using different sets of traversal paths originating at different starting vertices and aggregating the probability values for different sets of traversal paths. Also, a probabilities that the secondary vertex is included in a plurality of traversal paths can include determining more than one probability value using different sets of traversal paths for different numbers of hops originating at one or more starting vertices and aggregating the probability values for the sets of traversal paths for the different numbers of hops.

In various embodiments one or more initial vertices for traversal paths are defined by a probability value for one or more vertices of the graph representation being provided, defined, or otherwise determined. In embodiments, the one or more initial vertices may be new vertices to be added to the graph representation for which a probability value is provided, defined, or otherwise determined. One or more of the vertices with provided probability values may be used as starting vertices for sets random traversal paths, and the initial probability values may be propagated along the random traversal paths according to the edge weights as discussed herein.

From stage 750 where the probability values are determined, the method 700 may proceed to stage 760 where the probability values are aggregated. For example, different sets of traversal paths may be generated using different edge weight parameters to define the random traversal paths. A probability value for a secondary vertex can be determined for each set of traversal paths for the different parameter values. In embodiments, the probability values determined for a secondary vertex using different edge weight parameters are aggregated to determine a resulting probability value for the secondary vertex. Also, in some embodiments, traversal paths of length up to k hops may be generated for one or more initial vertices. A particular vertex may be a secondary vertex on traversal paths having different values k for the numbers of hops.

In some embodiments, the various probability values for the different initial vertices are aggregated to determine an aggregate resulting value. Further, for each initial vertex, more than one probability value can be also determined and aggregated corresponding to different edge weight parameters. In such embodiments, probability values for different edge weight parameters or combinations of edge weight parameters for paths beginning at each starting vertex can be determined and aggregated to determine an aggregate probability for paths starting at that vertex. In this way, the probability values that are aggregated for the traversal paths starting at different vertices are themselves aggregates of probability values using different edge weight parameter types. Thus, a secondary vertex may have multiple probability values associated with the likelihood of being on respective random traversal paths starting at different starting vertices, using different edge weight parameters, or having a different number of hops.

In certain embodiments, to perform the calculations associated with aggregating probability values for one or more parameter types for one or more initial vertices and probability values for one or more initial vertices for a particular secondary vertex, an adjacency matrix A_d is defined for every parameter type d affecting edge weight. In this example, if n is the number of vertices in the graph representation, then A_d is of dimension n*n. Rows and columns of the adjacency matrix A_d may be an ordered list of entities represented by the graph representation. For example, if there is an edge between companies i and j that has edge weight w_d then the value w_d is added in row i, column j, of the adjacency matrix A_d.

A vector V of size n can be defined which captures entity default probabilities for every index of the vector V. In this example, each index of the vector V corresponds to a vertex representing an entity, such as a company in an ecosystem represented by the graph representation.

To compute vertex features for weight type d for k hops away from a vertex, the vector V may be multiplied by the adjacency matrix A_d, a number k times equal to the number of hops. In this way, the computational cost of calculating vertex features for weight type d is reduced from a non-polynomial time complexity class to a bounded computational cost on the order of $O((n^{\wedge}(2.37*(k-1))+1))$ in the worst case scenario. In practice, the constant k for the random walk is bounded (for example k=5), and the vector V is generally sparse, thus the actual computation cost can be significantly below $O((n^{\wedge}(2.37*(k-1))+1))$.

Example System for Determining Probability of Events in Relational Networks

Figure 8:
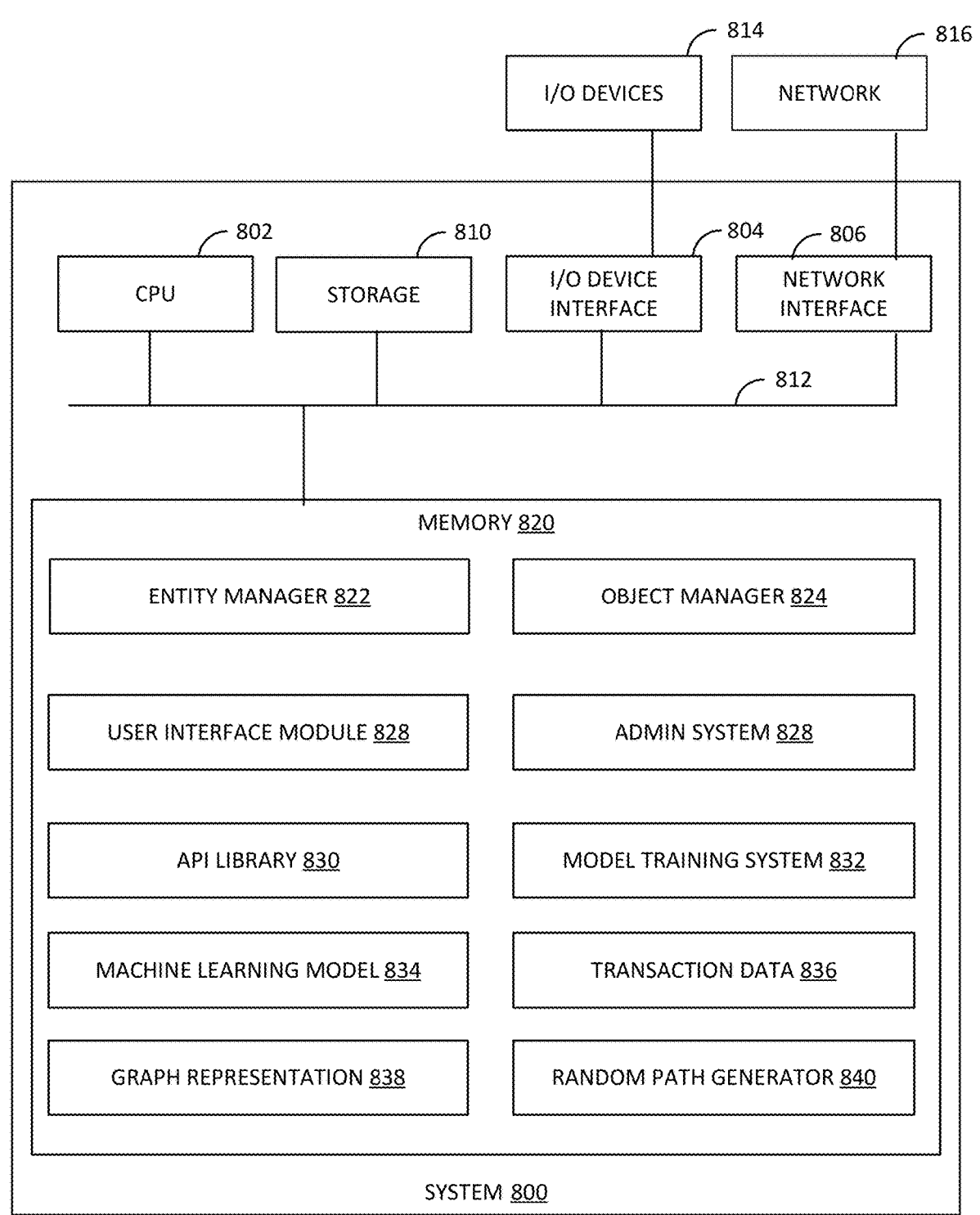
FIG. 8 illustrates an example system on which methods of relational network inferencing using random traversal paths of a graph representation can be performed, according to various embodiments.

FIG. 8 illustrates an example system 800 configured to perform the methods described herein, including, for example, operations 700 of FIG. 7. In some embodiments, system 800 may act as a probability estimator, risk assessor, or risk score evaluator, such as risk scorer of the application server 150 in FIG. 1.

As shown, system 800 includes a central processing unit (CPU) 802, one or more I/O device interfaces 804 that may allow for the connection of various I/O devices 814 (e.g., keyboards, displays, mouse devices, pen input, etc.) to the system 800, network interface 806 through which system 800 is connected to network 816 (which may be a local network, an intranet, the internet, or any other group of computing devices communicatively connected to each other), a memory 808, storage 810, and an interconnect 812. The I/O devices 814 and/or network interface 806 may be used to receive a query in a natural language utterance through a chatbot application and output a response to the query generated based on extracting operators and operands from the natural language utterance.

CPU 802 may retrieve and execute programming instructions stored in the memory 820. Similarly, the CPU 802 may retrieve and store application data residing in the memory 820. The interconnect 812 transmits programming instructions and application data, among the CPU 802, I/O device interface 804, network interface 806, and memory 820.

CPU 802 is included to be representative of a single CPU, multiple CPUs, a single CPU having multiple processing cores, and the like.

Memory 820 is representative of a volatile memory, such as a random access memory, or a nonvolatile memory, such as nonvolatile random access memory, phase change random access memory, or the like. As shown, memory 820 includes an entity manager 822, an object manager 824, a user interface module 826, an admin system 828, an API library 830, a model training system 832, a machine learning model 834, transaction data 836, a graph representation 838, and a random path generator 840.

In embodiments, the entity manager 822 generates, stores, changes, or otherwise manages entity information associated with entities determined from transaction data. The object manager 824 of embodiments generates, stores, changes, or otherwise manages object information, for example, relationships or relationship information between entities, accounts, or events. The user interface module 826 of embodiments generates, stores, changes, or otherwise manages user interfaces, which may for example be displayed on I/O devices 814 via the I/O Device Interface 804.

In various embodiments, an admin system 828 may be used to operate applications or functions, for example that generate hypothetical events, generate hypothetical transactions, adjust global weighting, parameters, or hyperparameters, adjust values for a particular entity or object, and/or otherwise make adjustments to an object or entity. Entities and objects generated, changed, or managed by the admin system can be used to generate a graph representation using the entities, object, and/or other metaparameters. Graph representations involving the admin system in this way may be used to generate training data, "fine-tuning data," for a machine learning trainer, and/or may be used as contextual information with input for a machine learning model. This data may be generated using random traversal path methods, as disclosed herein.

In embodiments, the API library 830, stores interfaces and related information for interfacing with various applications associate with the system.

The model training system 832 of embodiments may collect or process training data from various sources. The model training system 832 may use the training data to train or fine tune the machine learning model 834. In some cases, the model training system may provide training data, entities, objects, and/or events as context to the machine learning model and generating outputs from a particular input. In a particular embodiment, the training data may be included as context along with feedback, in an iterative process which loops to continuously improve the outputs achieved by the trained model.

The transaction data 836 may include a plurality of entities, transactions, or relationships between entities, and related data, such as the various parameter types discussed herein. As discussed, the graph representation 838 may include nodes representing the entities and edges representing transactions or relationships between the entities. In embodiments, the random path generator 840 generates a plurality of traversal paths, which may be a specified number of paths for each node which may be specified by a user or administrator, using a particular number of hops, which may also be specified by a user or administrator. The random path generator may include a random number generator used to select outgoing edges according to relative edge weight.

Example Clauses

Aspect 1: A method of resource-efficient relational network inferencing, comprising: defining, for a graph representation, a plurality of traversal paths including: a starting vertex having an initial probability value; and a random hop selected based on a weight of an edge and a total weight of selectable edges for the hop; and determining a probability that an entity represented by a particular vertex will be impacted by an event associated with the starting vertex based on the initial probability value and a proportion of the plurality of traversal paths that includes the particular vertex.

Aspect 2: The method of Aspect 1, wherein: the random hop is a first random hop selected based a first parameter of the weight; and the plurality of traversal paths includes a second random hop selected based on a second parameter.

Aspect 3: The method of any of Aspects 1-2, wherein the plurality of traversal paths comprises a first traversal path having a first number of hops and a second traversal path having a second number of hops.

Aspect 4: The method of any of Aspect 1-3, wherein the plurality of traversal paths is defined using a minimum number of hops per path and a maximum number of hops per path.

Aspect 5: The method of any of Aspects 1-4, wherein: the starting vertex is a first starting vertex; the initial probability value is a first initial probability value; the plurality of traversal paths includes a second starting vertex having a second initial probability value; and the method comprises determining an aggregate probability that the entity represented by the vertex will be impacted by an event associated with at least one of the first starting vertex and the second starting vertex based on the first initial probability value, the second initial probability value, and the proportion of the plurality of traversal paths that includes the vertex.

Aspect 6: The method of any of Aspects 1-5, wherein the weight is determined by a template defining edge weight based on a selection from: a transaction type of an occurrence, a number of transaction occurrences, and an amount of a transaction payment.

Aspect 7: The method of any of Aspects 1-6, wherein: the vertex represents a first entity, the starting vertex represents a second entity, the edge represents a transaction, the event comprises a default of the second entity; and the method comprises determining a risk of default for the first entity based on the default of the second entity and the transaction.

Aspect 8: The method of any of Aspects 1-7, wherein: the plurality of traversal paths is a first plurality of traversal paths; and the method further comprises: defining, for the graph representation, a second plurality of traversal paths starting at the particular vertex and using the probability that the entity represented by the particular vertex will be impacted; and determining a second probability that a second entity represented by a second vertex will be impacted by the event associated with the starting vertex based on a proportion of the second plurality of traversal paths that includes the second vertex.

Aspect 9: A system comprising a computing device having a processor and a memory having executable instructions stored thereon, which, when executed, cause the processor to perform a method of: defining, for a graph representation, a plurality of traversal paths including: a starting vertex having an initial probability value; and a random hop selected based on a weight of an edge and a total weight of selectable edges for the hop; and determining a probability that an entity represented by a particular vertex will be impacted by an event associated with the starting vertex based on the initial probability value and a proportion of the plurality of traversal paths that includes the particular vertex.

Aspect 10: The system of Aspect 9, wherein: the random hop is a first random hop selected based a first parameter of the weight; and the plurality of traversal paths includes a second random hop selected based on a second parameter.

Aspect 11: The system of any of Aspects 9-10, wherein the plurality of traversal paths comprises a first traversal path having a first number of hops and a second traversal path having a second number of hops.

Aspect 12: The system of any of Aspects 9-11, wherein the plurality of traversal paths is defined using a minimum number of hops per path and a maximum number of hops per path.

Aspect 13: The system of any of Aspects 9-12, wherein: the starting vertex is a first starting vertex; the initial probability value is a first initial probability value; the plurality of traversal paths includes a second starting vertex having a second initial probability value; and the method comprises determining an aggregate probability that the entity represented by the vertex will be impacted by an event associated with at least one of the first starting vertex and the second starting vertex based on the first initial probability value, the second initial probability value, and the proportion of the plurality of traversal paths that includes the vertex.

Aspect 14: The system of any of Aspects 9-13, wherein the weight is determined by a template defining edge weight based on a selection from: a transaction type of an occurrence, a number of transaction occurrences, and an amount of a transaction payment.

Aspect 15: The system of any of Aspects 9-14, wherein: the vertex represents a first entity, the starting vertex represents a second entity, the edge represents a transaction, the event comprises a default of the second entity; and the method comprises determining a risk of default for the first entity based on the default of the second entity and the transaction.

Aspect 16: The system of any of Aspects 9-15, wherein: the plurality of traversal paths is a first plurality of traversal paths; and the method further comprises: defining, for the graph representation, a second plurality of traversal paths starting at the particular vertex and using the probability that the entity represented by the particular vertex will be impacted; and determining a second probability that a second entity represented by a second vertex will be impacted by the event associated with the starting vertex based on a proportion of the second plurality of traversal paths that includes the second vertex.

Aspect 17: A non-transitory computer-readable medium comprising instructions that, when executed by one or more processors, cause the one or more processors to perform a method for determining a graph feature, the method comprising: defining, for a graph representation, a plurality of traversal paths including: a starting vertex having an initial probability value; and a random hop selected based on a weight of an edge and a total weight of selectable edges for the hop; and determining a probability that an entity represented by a particular vertex will be impacted by an event associated with the starting vertex based on the initial probability value and a proportion of the plurality of traversal paths that includes the particular vertex.

Aspect 18: The non-transitory computer-readable medium of Aspect 17, wherein the plurality of traversal paths comprises a first traversal path having a first number of hops and a second traversal path having a second number of hops; and the plurality of traversal paths is defined using a minimum number of hops per path and a maximum number of hops per path.

Aspect 19: The non-transitory computer-readable medium of any of Aspects 17-18, wherein: the starting vertex is a first starting vertex; the initial probability value is a first initial probability value; the plurality of traversal paths includes a second starting vertex having a second initial probability value; and the method comprises determining an aggregate probability that the entity represented by the vertex will be impacted by an event associated with at least one of the first starting vertex and the second starting vertex based on the first initial probability value, the second initial probability value, and the proportion of the plurality of traversal paths that includes the vertex.

Aspect 20: The non-transitory computer-readable medium of any of Aspects 17-19, wherein: the plurality of traversal paths is a first plurality of traversal paths; and the method further comprises: defining, for the graph representation, a second plurality of traversal paths starting at the particular vertex and using the probability that the entity represented by the particular vertex will be impacted; and determining a second probability that a second entity represented by a second vertex will be impacted by the event associated with the starting vertex based on a proportion of the second plurality of traversal paths that includes the second vertex.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of resource-efficient relational network inferencing, comprising:

generating, by an application server, for a graph representation, a plurality of traversal paths including:

a starting vertex having an initial probability value; and a random hop selected based on a weight of an edge and a total weight of selectable edges for the random hop;

generating, by the application server, one or more entity features comprising a probability that an entity represented by a particular vertex will be impacted by an event associated with the starting vertex based on the initial probability value and a proportion of the plurality of traversal paths that includes the particular vertex, wherein the entity is a company or a person, and wherein the application server generates the one or more entity features based on a bounded computational cost graph traversal process that reduces computing resource utilization through use of a constant determined based on a number of hops;

providing, by the application server, the one or more entity features as inputs to a machine learning model that has been trained through an iterative model optimization process based on features of the graph representation;

generating, by the machine learning model based on the inputs, an output indicating a probability of a corresponding event relating to the entity; and performing, by the application server, an action related to the entity based on the output from the machine learning model.

2. The method of claim 1, wherein:

the random hop is a first random hop selected based a first parameter of the weight; and the plurality of traversal paths includes a second random hop selected based on a second parameter.

3. The method of claim 1, wherein the plurality of traversal paths comprises a first traversal path having a first number of hops and a second traversal path having a second number of hops.

4. The method of claim 3, wherein the plurality of traversal paths is defined using a minimum number of hops per path and a maximum number of hops per path.

5. The method of claim 1, wherein:

the starting vertex is a first starting vertex;

the initial probability value is a first initial probability value;

the plurality of traversal paths includes a second starting vertex having a second initial probability value; and the method comprises determining an aggregate probability that the entity represented by the particular vertex will be impacted by an event associated with at least one of the first starting vertex and the second starting vertex based on the first initial probability value, the second initial probability value, and the proportion of the plurality of traversal paths that includes the particular vertex.

6. The method of claim 1, wherein the weight is determined by a template defining edge weight based on a selection from: a transaction type of an occurrence, a number of transaction occurrences, and an amount of a transaction payment.

7. The method of claim 1, wherein:

the particular vertex represents a first entity, the starting vertex represents a second entity, the edge represents a transaction, and the event comprises a default of the second entity.

8. The method of claim 1, wherein:

the plurality of traversal paths is a first plurality of traversal paths; and the method further comprises:

defining, for the graph representation, a second plurality of traversal paths starting at the particular vertex and using the probability that the entity represented by the particular vertex will be impacted; and determining a second probability that a second entity represented by a second vertex will be impacted by the event associated with the starting vertex based on a proportion of the second plurality of traversal paths that includes the second vertex.

9. A system comprising a computing device having a processor and a memory having executable instructions stored thereon, which, when executed, cause the processor to perform a method of:

generating, by an application server, for a graph representation, a plurality of traversal paths including:

a starting vertex having an initial probability value; and a random hop selected based on a weight of an edge and a total weight of selectable edges for the random hop;

generating, by the application server, one or more entity features comprising a probability that an entity represented by a particular vertex will be impacted by an event associated with the starting vertex based on the initial probability value and a proportion of the plurality of traversal paths that includes the particular vertex, wherein the entity is a company or a person, and wherein the application server generates the one or more entity features based on a bounded computational cost graph traversal process that reduces computing resource utilization through use of a constant determined based on a number of hops;

providing, by the application server, the one or more entity features as inputs to a machine learning model that has been trained through an iterative model optimization process based on features of the graph representation;

generating, by the machine learning model based on the inputs, an output indicating a probability of a corresponding event relating to the entity; and performing, by the application server, an action related to the entity based on the output from the machine learning model.

10. The system of claim 9, wherein:

the random hop is a first random hop selected based a first parameter of the weight; and the plurality of traversal paths includes a second random hop selected based on a second parameter.

11. The system of claim 9, wherein the plurality of traversal paths comprises a first traversal path having a first number of hops and a second traversal path having a second number of hops.

12. The system of claim 11, wherein the plurality of traversal paths is defined using a minimum number of hops per path and a maximum number of hops per path.

13. The system of claim 9, wherein:

the starting vertex is a first starting vertex;

the initial probability value is a first initial probability value;

the plurality of traversal paths includes a second starting vertex having a second initial probability value; and the method comprises determining an aggregate probability that the entity represented by the particular vertex will be impacted by an event associated with at least one of the first starting vertex and the second starting vertex based on the first initial probability value, the second initial probability value, and the proportion of the plurality of traversal paths that includes the particular vertex.

14. The system of claim 9, wherein the weight is determined by a template defining edge weight based on a selection from: a transaction type of an occurrence, a number of transaction occurrences, and an amount of a transaction payment.

15. The system of claim 9, wherein:

the particular vertex represents a first entity, the starting vertex represents a second entity, the edge represents a transaction, and the event comprises a default of the second entity.

16. The system of claim 9, wherein:

the plurality of traversal paths is a first plurality of traversal paths; and the method further comprises:

defining, for the graph representation, a second plurality of traversal paths starting at the particular vertex and using the probability that the entity represented by the particular vertex will be impacted; and determining a second probability that a second entity represented by a second vertex will be impacted by the event associated with the starting vertex based on a proportion of the second plurality of traversal paths that includes the second vertex.

17. A non-transitory computer-readable medium comprising instructions that, when executed by a processor, cause the processor to perform a method for determining a graph feature, the method comprising:

generating, by an application server, for a graph representation, a plurality of traversal paths including:

a starting vertex having an initial probability value; and a random hop selected based on a weight of an edge and a total weight of selectable edges for the random hop;

generating, by the application server, one or more entity features comprising a probability that an entity represented by a particular vertex will be impacted by an event associated with the starting vertex based on the initial probability value and a proportion of the plurality of traversal paths that includes the particular vertex, wherein the entity is a company or a person, and wherein the application server generates the one or more entity features based on a bounded computational cost graph traversal process that reduces computing resource utilization through use of a constant determined based on a number of hops;

providing, by the application server, the one or more entity features as inputs to a machine learning model that has been trained through an iterative model optimization process based on features of the graph representation;

generating, by the machine learning model based on the inputs, an output indicating a probability of a corresponding event relating to the entity; and performing, by the application server, an action related to the entity based on the output from the machine learning model.

18. The non-transitory computer-readable medium of claim 17, wherein the plurality of traversal paths comprises a first traversal path having a first number of hops and a second traversal path having a second number of hops; and the plurality of traversal paths is defined using a minimum number of hops per path and a maximum number of hops per path.

19. The non-transitory computer-readable medium of claim 17, wherein:

the starting vertex is a first starting vertex;

the initial probability value is a first initial probability value;

the plurality of traversal paths includes a second starting vertex having a second initial probability value; and the method comprises determining an aggregate probability that the entity represented by the particular vertex will be impacted by an event associated with at least one of the first starting vertex and the second starting vertex based on the first initial probability value, the second initial probability value, and the proportion of the plurality of traversal paths that includes the particular vertex.

20. The non-transitory computer-readable medium of claim 17, wherein:

the plurality of traversal paths is a first plurality of traversal paths; and the method further comprises:

defining, for the graph representation, a second plurality of traversal paths starting at the particular vertex and using the probability that the entity represented by the particular vertex will be impacted; and determining a second probability that a second entity represented by a second vertex will be impacted by the event associated with the starting vertex based on a proportion of the second plurality of traversal paths that includes the second vertex.

* * * * *